United States Patent [19]

Arai

[11] 4,362,981

[45] Dec. 7, 1982

[54] DRIVING CIRCUIT FOR A STEPPING MOTOR

[75] Inventor: Satoshi Arai, Tokyo, Japan

[73] Assignee: Kabushiki Kaisha Daini Seikosha, Japan

[21] Appl. No.: 186,537

[22] Filed: Sep. 12, 1980

[51] Int. Cl.³ ............................................. G05B 19/40
[52] U.S. Cl. ..................................... 318/696; 318/138
[58] Field of Search ............................... 318/138, 696

[56] References Cited

U.S. PATENT DOCUMENTS

| | | | |
|---|---|---|---|
| 4,200,879 | 4/1980 | Nonaka et al. | 357/43 |
| 4,205,334 | 5/1980 | Nonaka et al. | 357/41 |
| 4,227,135 | 10/1980 | Kawamura | 318/696 |
| 4,241,433 | 12/1980 | Ueda et al. | 318/696 |
| 4,242,623 | 12/1980 | Outet et al. | 318/696 |

Primary Examiner—David Smith, Jr.
Assistant Examiner—G. Z. Rubinson
Attorney, Agent, or Firm—Robert E. Burns; Emmanuel J. Lobato; Bruce L. Adams

[57] ABSTRACT

A driving circuit for a stepping motor has a pair of emitter-connected PNP transistors with the common junction point of the emitters connected to a source voltage. A pair of source-connected static induction transistors each has its drain connected to the collector of one PNP transistor with the connection point being connected to one side of the drive coil of the motor. The leak current characteristic of the static induction transistors along their drain-to-source paths is chosen so that sufficient leak current flows when all four transistors are simultaneously in the OFF state to effectively dampen the motor.

5 Claims, 8 Drawing Figures

DRIVING CIRCUIT FOR A STEPPING MOTOR

BACKGROUND OF THE INVENTION

The present invention relates to a stepping motor driving circuit using static induction transistors.

Most integrated circuits for timepieces are fabricated by using C-MOS transistor technology. These C-MOS transistors are generally of the normally OFF type so that their power consumption is small. It is known in the horology art that in order to fabricate a high accuracy wristwatch having an error on the order of seconds per year, it is necessary to use a quartz oscillator having a good temperature characteristic and a capability of oscillating at several MHz frequency. Since almost all of the current consumption in C-MOS transistors is produced by flowing current therethrough at the switching operations, such transistors ae disadvantageous in that the power consumption is increased in proportion to the operating frequency. Therefore, in the case that the operating frequency of the integrated circuit is approximately several MHz, although a static induction transistor (SIT) is close to a normally ON type as compared with the C-MOS transistor, the SIT is desirable due to its lower power comsumption.

The conventional arrangement of an integrated circuit for a timepiece will be described in conjunction with FIG. 1. The current for operating an oscillator 2 is supplied from a constant current circuit 1a so as to improve the operable temperature range for the oscillator 2. The current for a pair of frequency dividing circuits (which include a waveform shaping circuit) 3a and 3b is supplied from a constant current circuit 1b. An output from the oscillator 2 is changed into drive pulses having a period of 0.5[sec] and a pulse width of about 8[ms] in the frequency driving circuits 3a and 3b. A driving circuit 4 is controlled in accordance with the drive pulses to rotate a motor M.

FIG. 2a is a sectional view illustrating the structure of a SITL device used in the oscillating circuit 2 and the frequency dividing circuit (including the waveform shaping circuit) 3. A buried layer 7 is formed by diffusing an N type impurity into a P type substrate 8, and then, an $N^-$ epitaxtial layer 6 (which has, for example, an impurity density of $3 \times 10^{13}/cm^3$) is formed. The SIT includes a gate G formed by diffusing a $P^+$ impurity into the bottom of a V-shaped concave portion 9, and a drain D formed by diffusing an $N^+$ impurity into the region above the gate G and the burid layer 7. The SIT structure is known as a step type static induction transistor. A lateral PNP transistor (PNP $Tr_1$) is used as a load transistor of the SIT. The load transistor is composed of a collector which also acts as the gate G, an emitter which is formed during the same fabrication step as that in which the gate G is formed and which functions as an injector $I_j$, and a base which acts as a source S. An insulating layer 5 is made of a silicon oxide. A wire 10 is made of an aluminum, for example. FIG. 2b is an equivalent circuit diagram of FIG. 2a and the PNP transistor $Tr_1$ is used as a bias transistor of the SIT $Tr_2$.

FIG. 2c illustrates a sectional structure of the lateral PNP transistor used in the constant current circuit 1, the oscillating circuit 2 and the driving circuit 4. An emitter $E_1$ and a collector $C_1$ are formed by the use of P type impurity on the bottom of a V-shaped concave portion 11 and are fabricated in the same step as that of the gate G. The base $B_1$ is drawn out by a V-shaped concave portion 12 and projects from the surface as shown. FIG. 2d is a sectional view of a vertical NPN transistor (NPN Tr) used in the constant current circuit 1 and the driving circuit 4. The NPN Tr consists of an emitter $E_2$ formed by a similar step to that for forming the drain D, a base $B_2$ formed by diffusing a P type impurity, and a buried layer which acts as a collector $C_2$.

The circuit composition of the driving circuit is illustrated in FIG. 3. A $Tr_3$ and a $Tr_5$ are PNP transistors, and a $Tr_4$ and a $Tr_6$ are NPN transistors. The coil of the motor M is connected between the group of the $Tr_3$ and the $Tr_6$ and the group of the $Tr_4$ and the $Tr_5$, and the transistor groups are alternately switched ON and OFF to rotate the motor. In normal operation, the motor M is rotated by 0.5 revolutions per second. Since the time required for 0.5 revolution of motor takes about 8[msec], the motor is in a non rotating condition for almost all of the one second duration. When any mechanical shock is applied to a wristwatch during the non-rotating condition (stop mode) of the motor, there is possibility that the shock will cause mis-rotation of the motor and the accuracy of the watch may thereby be lowerred due to the unwanted rotation of the motor. To eliminate such an unwanted rotation, in the conventional driving circuit 4, the $Tr_4$ and the $Tr_6$ are placed in a conducting condition during the duration of the stop mode of the motor and the motor is thereby placed in a damped condition. This damping method is extremely useful in order to prevent the motor M from mis-rotating by an externally applied mechanical shock.

However, since the $Tr_4$ and the $Tr_6$ are bi-polar transistors, the base current flows even when the motor M is in a stopped, i.e., non-rotating, condition, so that, current comsumption occurs in the driving circuit 4.

SUMMARY OF THE INVENTION

An object of the present invention is to eliminate the above-described disadvantage and to provide a driving circuit exhibiting a decreased current comsumption during the damping operation of the motor by replacing the NPN transistors of the driving circuit with SIT transistors.

BRIEF DESCRIPTION OF THE DRAWINGS

FIG. 2b is an equivalent circuit diagram for FIG. 2a.

DESCRIPTION OF THE PREFERRED EMBODIMENTS

Figure 1:
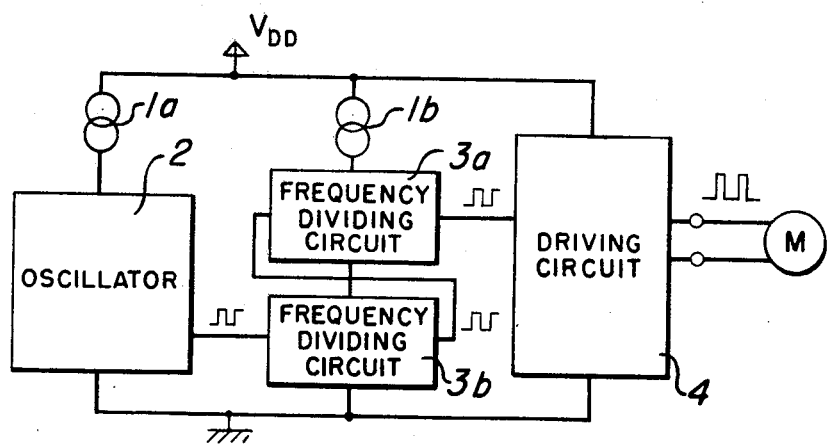
FIG. 1 is a block diagram of a conventional IC for a analog type timepiece.
Figure 2A:
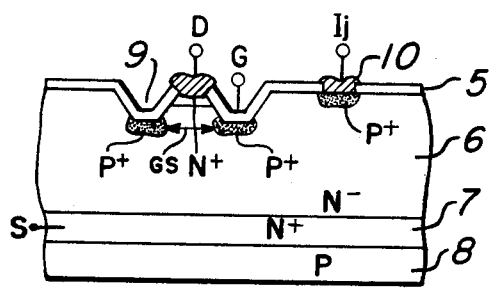
FIG. 2a is a sectional view of a static induction transistor logic device.
Figure 2C:
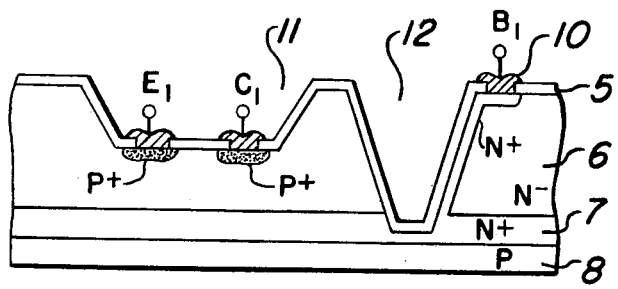
FIG. 2c is a sectional view of a PNP transistor structure.
Figure 2B:
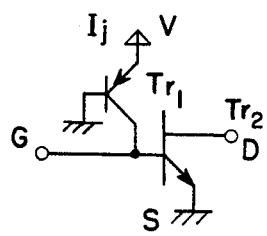
Figure 2D:
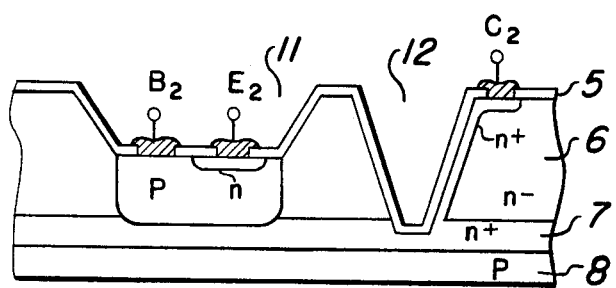
FIG. 2d is a sectional view of an NPN transistor structure.
Figure 3:
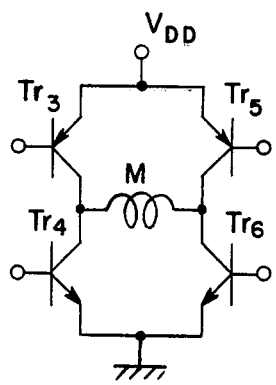
FIG. 3 is a diagram of a conventional driving circuit.
Figure 4:
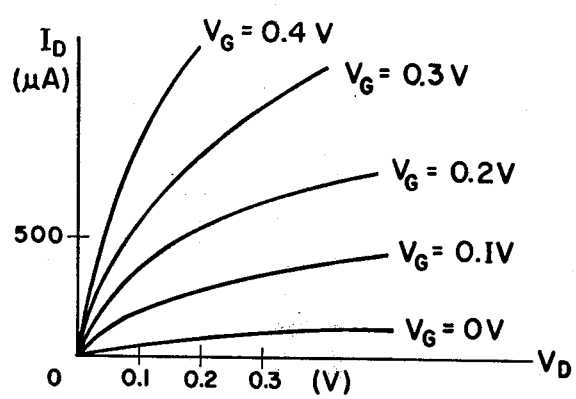
FIG. 4 is a graph of the static characteristic of a SIT transistor.
Figure 5:
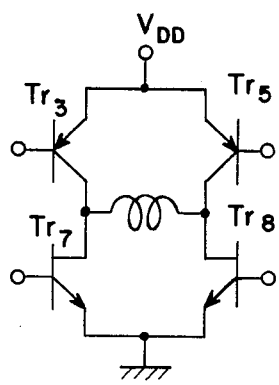
FIG. 5 is a circuit diagram of a driving circuit according to the present invention.

The present invention will be hereinafter described in detail in conjunction with FIGS. 4 and 5. FIG. 4 is a graph of the static characteristic of a SIT transistor, wherein the axis of abscissas represent a drain voltage $V_D$ and the axis of ordinates represent a drain current $I_D$. A family of gate voltage $V_G$ curves appear therein as a parameter. The static characteristic of the SIT transistor is different from that of the bi-polar transistor. One advantageous feature of the SIT transistor is that the leak current characteristic at zero volts of the gate voltage $V_G$ can be selected at any value in accordance with a selected position of a gate space GS (see FIG. 2a) or a gate G in a vertical direction. FIG. 5 is a circuit diagram of an embodiment of the driving circuit 4 of the present invention. Each of the PNP transistors $Tr_3$ and $Tr_5$ is conventional. However, the PNP transistors $Tr_4$ and $Tr_6$ shown in FIG. 3 are replaced with SIT transistors $Tr_7$ and $Tr_8$ whose sources are connected together and whose drains are connected to respective ones of the collectors of the PNP transistors $Tr_3$ and $Tr_5$ at junction points which are connected to opposite ends of the coil of the motor M. The gate space is formed in such a way that the leak current of the SIT transistors $Tr_7$ and $Tr_8$, in which the gate voltage $V_G$ is zero volts, is approximately, for example, 10 [$\mu$A].

The value of the leak current is determined so as to be able to effectively damp the motor M.

Next, the operation of the driving circuit 4 shown in FIG. 5 will be described. When the driving circuit 4 of the present invention drives the motor M, the operation thereof is the same as that of the conventional driving circuit. However, in the driving circuit 4 of the present invention, all of the transistors $Tr_3$, $Tr_5$, $Tr_7$ and $Tr_8$ are in the OFF condition when the motor M is in the damping state. This enables damping of the motor M using the leak current at the time when each gate voltage $V_G$ of the SIT transistors $Tr_7$ and $Tr_8$ is O[V].

The SIT used in the driving circuit according to the present invention need not be limited to those of V-shaped concave portion type.

As described above, according to the present invention, all of the transistors of the driving circuit are arranged to be in the OFF condition when the driving circuit damps the motor. As a result, since the current consumption is in the driving circuit is so small that the value thereof can be neglected when the motor is under the damped condition, the invention achieves a significant reduction of current consumption in the integrated circuit.

What is claimed is:

1. A driving circuit for a stepping motor, comprising: first and second static induction transistors whose sources are connected together and each having a leak current characteristic between its drain and source selected so as to be approximately 10 $\mu$A; first and second PNP transistors each having an emitter connected to a source voltage; and a motor having one terminal connected to a junction point of the drain of said first static induction transistor and the collector of said first PNP transistor and another terminal connected to a junction point of the drain of said second static induction transistor and the collector of said second PNP transistor.

2. In a driving circuit for stepwise driving a stepping motor having a drive coil: first and second bi-polar transistors having their respective emitters connected to a common junction point which is connectable to a source voltage during use of the driving circuit; first and second static induction transistors having their respective sources connected together; means connecting one end of the drive coil to a junction point of the collector of the first bi-polar transistor and the drain of the first static induction transistor and connecting the other end of the drive coil to a junction point of the collector of the second bi-polar transistor and the drain of the second static induction transistor; and wherein the first and second static induction transistors have a leak current characteristic in their respective drain-to-source paths when in the OFF state effective to dampen the motor when the first and second bi-polar transistors and the first and second static induction transistors are simultaneously all in the OFF state.

3. A driving circuit according to claim 2; wherein the leak current characteristic of said first and second static induction transistors is on the order of 10 $\mu$A.

4. A driving circuit according to claim 2 or 3; wherein the leak current characteristic of said first and second static induction transistors is based on a gate voltage of zero volts.

5. A driving circuit according to claim 2 or 3; wherein the first and second bi-polar transistors comprise PNP transistors.

* * * * *